UNITED STATES PATENT OFFICE.

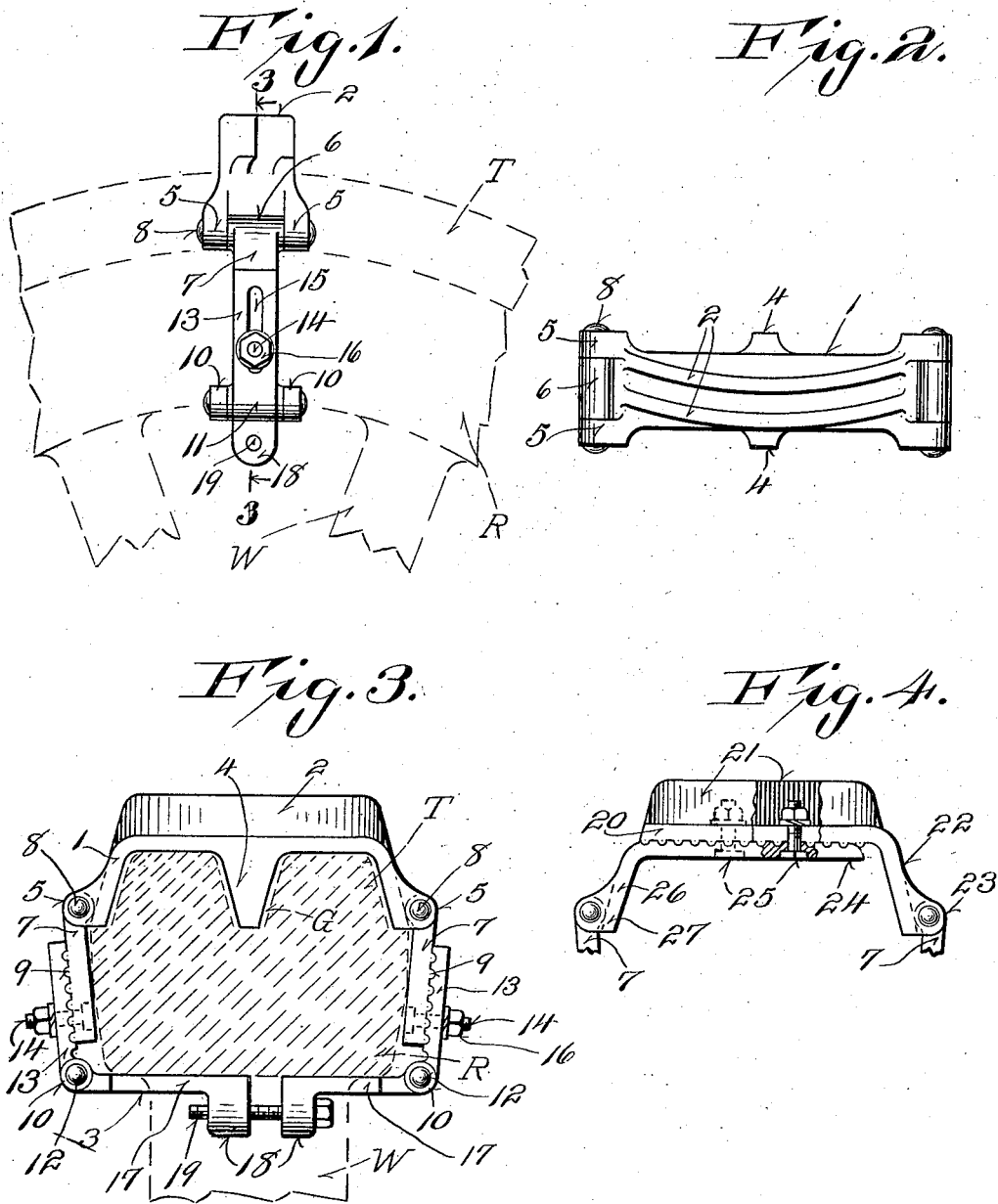

WALTER HENRY FERCH, OF MILWAUKEE, WISCONSIN.

TRACTION DEVICE FOR AUTOMOBILES AND THE LIKE.

1,346,813. Specification of Letters Patent. Patented July 20, 1920.

Application filed April 17, 1919. Serial No. 290,790.

*To all whom it may concern:*

Be it known that I, WALTER HENRY FERCH, a citizen of the United States, and resident of Milwaukee, in the county of Milwaukee and State of Wisconsin, have invented certain new and useful Improvements in Traction Devices for Automobiles and the like; and I do hereby declare that the following is a full, clear, and exact description thereof.

My invention relates to vehicle traction means, and more particularly to detachable devices which can be readily attached to or detached from the wheels of automobile trucks and similar self-propelled vehicles.

It is, of course, well known that automobile and truck tires vary in width and thickness with the style and weight of the vehicle with which they are used. Consequently in providing traction devices therefor, it is ordinarily necessary to design and make a plurality of different sizes for the several different tires. The principal object of this invention is to provide a traction device which may be readily adjustable to tires of different thicknesses.

In connection with this principal object of the invention it is also the object to provide means for efficiently clamping traction devices to the wheels to prevent both radial and circumferential movement.

A further object is to provide a traction device having a ground engaging member formed with curved ribs to procure increased traction.

With these general objects and advantages in view, the invention resides in the novel features of construction, combination and arrangement of parts which will be hereinafter more particularly described and claimed and shown in the drawing in which:

Figure 1 represents a side elevational view of a portion of a motor-truck wheel having a traction device of my improved design secured upon the rim or tire thereof.

Fig. 2 is a plan view of the device showing more particularly the shape and positioning of the traction ribs.

Fig. 3 is a transverse sectional view through the tire, the traction device being shown in side elevation and Fig. 4 is a similar view of a modified form of the invention.

Although the traction device illustrated is designed primarily for heavy duty work in connection with motor-truck wheels of large size, it is to be understood that various changes may be made in the form and proportion of the several parts to accommodate the invention for use in connection with other types of vehicles. Similarly changes and improvements in the construction and use of the device illustrated may be made without departing from or sacrificing any of the principles of the invention.

Referring more particularly to the forms depicted, it will be seen that the one shown in Figs. 1 to 3 is secured upon the rim R and the tire T of a wheel W, said tire being of that type which has a centrally disposed circumferentially extending groove G. A plurality of the devices is adapted to be secured in the manner shown at intervals around the tire.

The form of the invention above referred to comprises a preferably cast traction plate 1 having a plurality of ground engaging ribs 2 that extend longitudinally thereof, but transversely of the tire T, a two-part retaining clamp 3, and adjustable means for connecting the opposite ends of the retaining clamp and the adjacent ends of the traction plate. The several ground engaging ribs 2 are longitudinally curved as indicated in Fig. 2 to secure a maximum traction, and are also parallel to each other. When the device is to be used with a tire having a groove G, the traction plate has an inwardly extending lug 4 which is centrally located and designed to extend into the groove G whereby the device is effectively held against shifting transversely of the tire.

The opposite ends of the plate 1 are extended laterally and inwardly and each is provided with a pair of spaced bearing eyes 5. Between each pair of said eyes 5 is disposed an eye 6 formed on one end of a link 7, pintles 8 being extended through the adjacent eyes 5 and 6 to pivot the links to the ends of the plate 1. From Fig. 3 particularly it will be noticed that these links 7 normally extend inwardly and engage the opposite sides of the tire T, their outer faces having a plurality of spaced transverse ribs 9.

Like the plate 1, the opposite ends of the two-part retaining clamp 3 are also each provided with a pair of spaced eyes 10 between which eyes 11 are designed to be pivoted by means of pintles 12. Said eyes 11 are carried by one end of coöperating attaching links 13, said links having a plurality of spaced grooves for interlocking engagement with the transverse ribs 9 on the first mentioned links 7.

A stub bolt 14 extends outwardly from each of the links 7 adjacent the free ends thereof for engagement in an elongated slot 15 in the adjacent link 13. Nuts 16 threaded on the outer ends of the stub bolts 14 bear against the links 13 and clamp the same in engagement with the other links 7.

The two-part retaining clamp 3 consists of a pair of normally spaced plates 17 having apertured lugs 18 formed on their adjacent ends. The apertures of said lugs aline and receive a retaining bolt 19 whereby the same may be held in spaced apart relation or drawn together at the will of the operator. This adjustability of the retaining clamp permits the traction device to be used, within certain limits, on tires of different widths.

In order that the device may be attached to a wheel, it is simply necessary to either remove one of the nuts 16 or the bolt 19, thus separating the several parts of the invention. The pivotal connection between the several elements readily permit the device to be conformed to the shape of the tire and rim and the adjustability of the attaching links permits the traction plate to be properly associated with the outer face of the tire. When the said attaching links have been properly adjusted, the device may be further clamped upon the tire and rim by rotating the bolt 19 in such a direction that the lugs 18 are drawn toward each other.

When, however, it is necessary to use one of the attaching devices on tires which vary greatly in transverse width, the traction plate is preferably provided with adjustable means whereby its length may be increased or decreased. Such a form of the invention is illustrated in Fig. 4, wherein it will be noted that said traction member consists of a plate 20 somewhat similar to the plate 1, it being provided with ground engaging ribs 21 and a laterally extending end 22 on which is formed a pair of spaced eyes 23. A second plate 24 is designed to underlie the plate 20 and to have interlocking engagement therewith by means of a plurality of coöperating ridges and grooves formed on the outer face of the former and the inner face of the latter; bolts 25 extend through the two plates to further hold them in adjusted positions. One end of the plate 24 is extended laterally as at 26 and has its free end provided with a pair of spaced bearing eyes 27.

The eyes 23 and 27 are adapted to have the links 7 pivoted thereto. The other parts of this modification of the invention are the same as those illustrated in Figs. 1 to 3, and the adjustment and application of such parts is the same as has hereinbefore been described.

What is claimed is:

A detachable traction device for vehicle wheels comprising in combination, an extensible and retractile traction member adjustable for different widths of tires, a retaining element adjustable for various felly widths, and an extensible and retractile connecting element pivotally connected to each corresponding end of the traction member and retaining element, said traction member including a pair of tread plates movable upon each other transversely of the tire to position their outer ends beyond the planes of the sides of the latter, the contacting faces of said plates having coöperative alternate ridges and grooves, and a bolt for securing the tread plates in adjusted positions, each of said connecting elements including a pair of engaging links having coöperative alternate ridges and grooves on their engaging faces, the outer end of one link of one pair being pivoted to the outer end of one of said tread plates, the outer end of the corresponding link of the other pair being pivoted to the outer end of the other tread plate, the other links of each pair being pivoted to the respective ends of the retaining element, and a bolt for securing the links of each pair together in adjusted relation, the retaining element including a pair of felly plates movable toward each other to draw the connecting elements into engagement with the sides of a tire after the same have been adjusted for radial length and the traction member adjusted for transverse length, whereby to securely clamp the traction device on a vehicle wheel.

In testimony that I claim the foregoing I have hereunto set my hand at Milwaukee, in the county of Milwaukee and State of Wisconsin.

WALTER HENRY FERCH.